United States Patent
Ljolje et al.

(10) Patent No.: US 9,484,024 B2
(45) Date of Patent: *Nov. 1, 2016

(54) SYSTEM AND METHOD FOR HANDLING REPEAT QUERIES DUE TO WRONG ASR OUTPUT BY MODIFYING AN ACOUSTIC, A LANGUAGE AND A SEMANTIC MODEL

(71) Applicant: AT&T Intellectual Property I, L.P., Atlanta, GA (US)

(72) Inventors: Andrej Ljolje, Morris Plains, NJ (US); Diamantino Antonio Caseiro, Philadelphia, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2 days.

This patent is subject to a terminal disclaimer.

(21) Appl. No.: 14/666,548

(22) Filed: Mar. 24, 2015

(65) Prior Publication Data

US 2015/0194150 A1 Jul. 9, 2015

Related U.S. Application Data

(63) Continuation of application No. 12/570,757, filed on Sep. 30, 2009, now Pat. No. 8,990,085.

(51) Int. Cl.
| | | |
|---|---|---|
| *G10L 21/00* | (2013.01) | |
| *G10L 15/00* | (2013.01) | |
| *G10L 15/18* | (2013.01) | |
| *G10L 15/183* | (2013.01) | |
| *G10L 15/065* | (2013.01) | |
| *G10L 15/06* | (2013.01) | |
| *G10L 15/22* | (2006.01) | |

(52) U.S. Cl.
CPC ......... *G10L 15/1815* (2013.01); *G10L 15/065* (2013.01); *G10L 15/183* (2013.01); *G10L 15/063* (2013.01); *G10L 15/22* (2013.01)

(58) Field of Classification Search
CPC .... G10L 15/065; G10L 15/063; G10L 15/22; G10L 15/183
USPC ....................................... 704/231
See application file for complete search history.

(56) References Cited

U.S. PATENT DOCUMENTS

| | | | |
|---|---|---|---|
| 8,428,944 B2 | 4/2013 | Poultney et al. | |
| 8,990,085 B2* | 3/2015 | Ljolje | G10L 15/065 |
| | | | 704/231 |
| 2007/0219798 A1* | 9/2007 | Wang | G10L 15/063 |
| | | | 704/257 |
| 2008/0059167 A1* | 3/2008 | Poultney | G10L 15/07 |
| | | | 704/231 |

* cited by examiner

*Primary Examiner* — Farzad Kazeminezhad

(57) ABSTRACT

Disclosed herein are systems, computer-implemented methods, and computer-readable storage media for handling expected repeat speech queries or other inputs. The method causes a computing device to detect a misrecognized speech query from a user, determine a tendency of the user to repeat speech queries based on previous user interactions, and adapt a speech recognition model based on the determined tendency before an expected repeat speech query. The method can further include recognizing the expected repeat speech query from the user based on the adapted speech recognition model. Adapting the speech recognition model can include modifying an acoustic model, a language model, and a semantic model. Adapting the speech recognition model can also include preparing a personalized search speech recognition model for the expected repeat query based on usage history and entries in a recognition lattice. The method can include retaining unmodified speech recognition models with adapted speech recognition models.

20 Claims, 4 Drawing Sheets

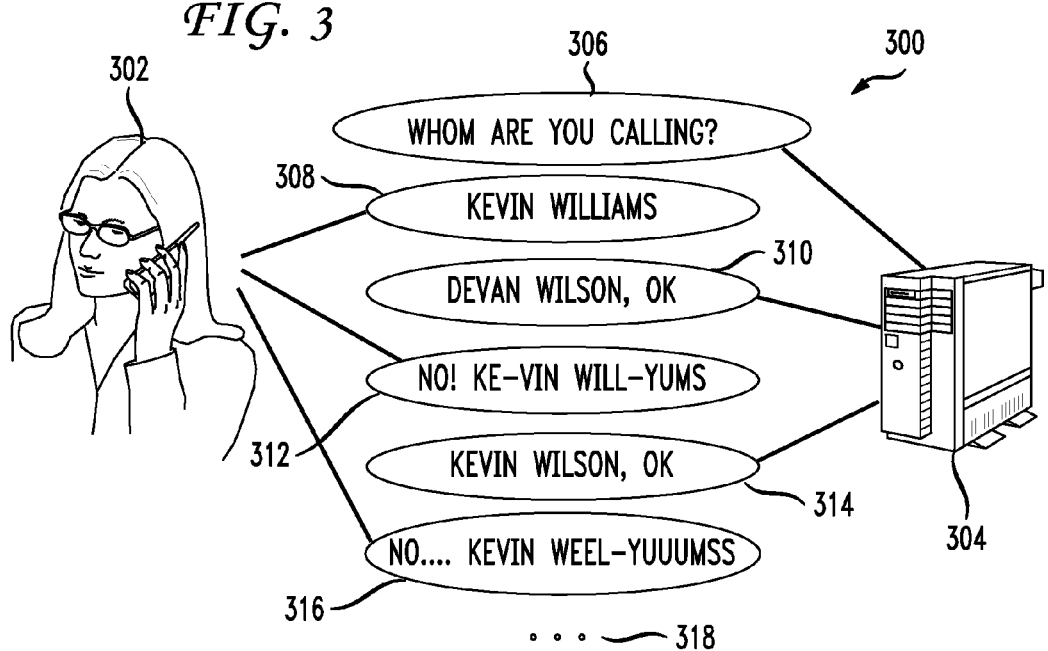
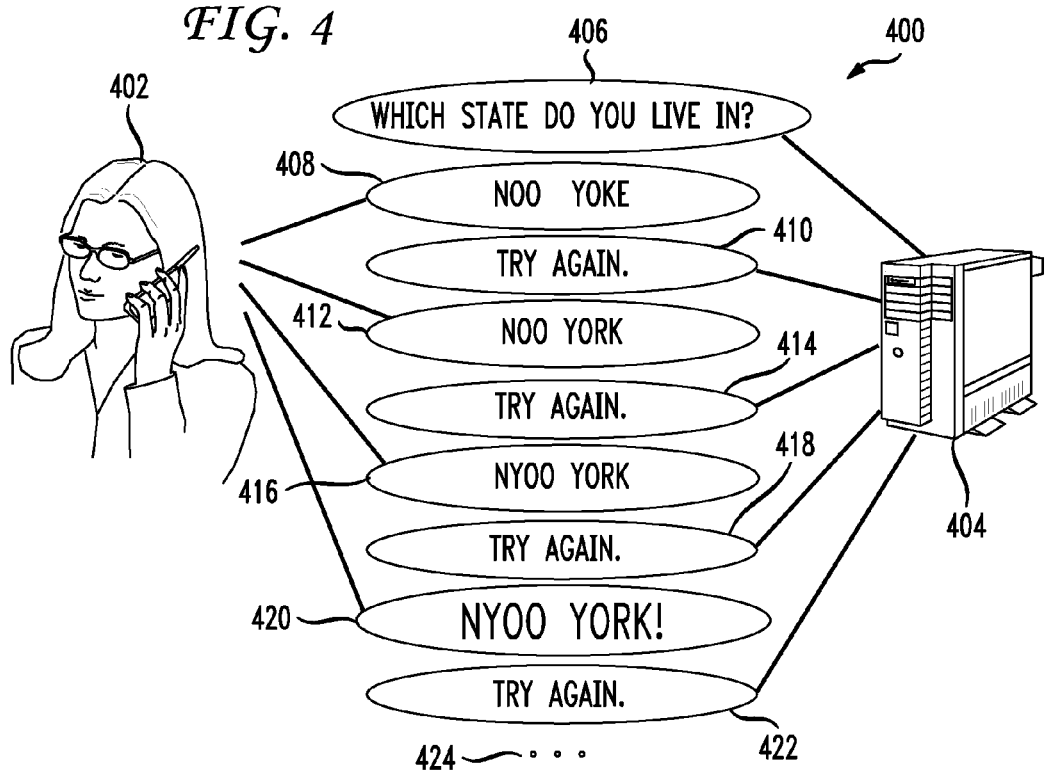

SYSTEM AND METHOD FOR HANDLING REPEAT QUERIES DUE TO WRONG ASR OUTPUT BY MODIFYING AN ACOUSTIC, A LANGUAGE AND A SEMANTIC MODEL

PRIORITY INFORMATION

The present application is a continuation of U.S. patent application Ser. No. 12/570,757, filed Sep. 30, 2009, the contents of which is incorporated herein by reference in its entirety.

BACKGROUND

1. Technical Field

The present disclosure relates to speech recognition and more specifically to dealing with repeat utterances.

2. Introduction

Users encounter automated spoken dialog systems on an increasingly frequent basis in situations such as renewing books in a library, registering purchased software, calling customer service, and many others. Spoken dialog systems often allow users to say a response aloud or enter their response using a keypad or keyboard on a mobile device such as a smartphone or PDA. Some users prefer to repeat the same utterance over and over rather than simply entering the same text, query, or utterance on the keypad. In an attempt to increase the recognition success, these users vary their syntax, style, microphone position, or other speech characteristics. Some determined users only give up after many attempts. If these repeat attempts do not provide the appropriate or expected result, the users are likely to abandon the speech application, reduce their use of the speech application, or become agitated when they must use the speech application.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, computer-implemented methods, and tangible computer-readable storage media for handling expected repeat speech queries. The method embodiment causing a computing device to perform the following steps: detecting via a processor a misrecognized speech query from a user, determining a tendency of the user to repeat speech queries based on previous user interactions, and adapting a speech recognition model based on the determined tendency before an expected repeat speech query. The system embodiment is configured to perform the steps of the method. The computer-readable storage medium embodiment stores a computer program having instructions for controlling a computing device to perform the method.

The method can include recognizing the expected repeat speech query from the user based on the adapted speech recognition model. Adapting the speech recognition model can include modifying one of an acoustic model, a language model, and a semantic model and/or preparing a personalized search speech recognition model for the expected repeat speech query based on the user's usage history and entries in a recognition lattice. In one embodiment, the method includes retaining an unmodified speech recognition model in parallel with the adapted speech recognition model.

The method can include recognizing the repeat speech query with the unmodified speech recognition model and with the adapted speech recognition model, determining a recognition certainty for the unmodified speech recognition model and the adapted speech recognition model, and basing further interaction with the user on the determined recognition certainty. The method can provide a mechanism to account for modified speech characteristics of the repeats by determining likely speech characteristics of the expected repeat speech query and tailoring the adapted speech recognition model to the likely speech characteristics of the expected repeat speech query. To facilitate later adaptations, the method can include recording user behavior in a speech query history.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 illustrates a sample dialog with repeat user utterances;
FIG. 4 illustrates another sample dialog with repeat user utterances.

DETAILED DESCRIPTION

Many speech or automatic speech recognition (ASR) based applications on personal communication devices such as cell phones provide an easy and simple interface for obtaining important information. Many users prefer to repeatedly use the ASR interface until the recognition is achieved rather than resort to using text input. If a misrecognition is detected and the user had the tendency in the past to repeat queries, the system 100 described below can apply appropriate adaptation schema immediately after the original (or subsequent) query in anticipation of the follow-up query. This ensures no additional latency and provides the opportunity to adapt all the models: acoustic, language, semantic, etc. This approach can be based on usage history and entries in the recognition lattice to prepare the new personalized search environment for the follow-up utterance occurring within a short period of time. A parallel recognition path with the generic models can ensure proper response if the new utterance is independent of the previous one.

This approach provides at least two major advantages over existing approaches. One advantage is that if the user repeats the query, the system 100 can select useful information in the original utterance for selecting the appropriate adaptation scheme for the acoustic, language and other models involved in the application. Often when the recognition output is incorrect, an alternative hypothesis with a lower score contains the correct answer. The change in the language model preserving all the paths in the recognition lattice, but minimizing the huge number of alternatives would provide much better chance of providing the correct answer. The second benefit is that all of the personalization can occur before the follow-up utterance is spoken, providing zero latency response. The safety mechanism is to run a generic setup in parallel in case the follow up utterance is a new and independent query. One important consequence of so many repeats is that the repeats provide plenty of material to improve the recognition performance through personalization.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
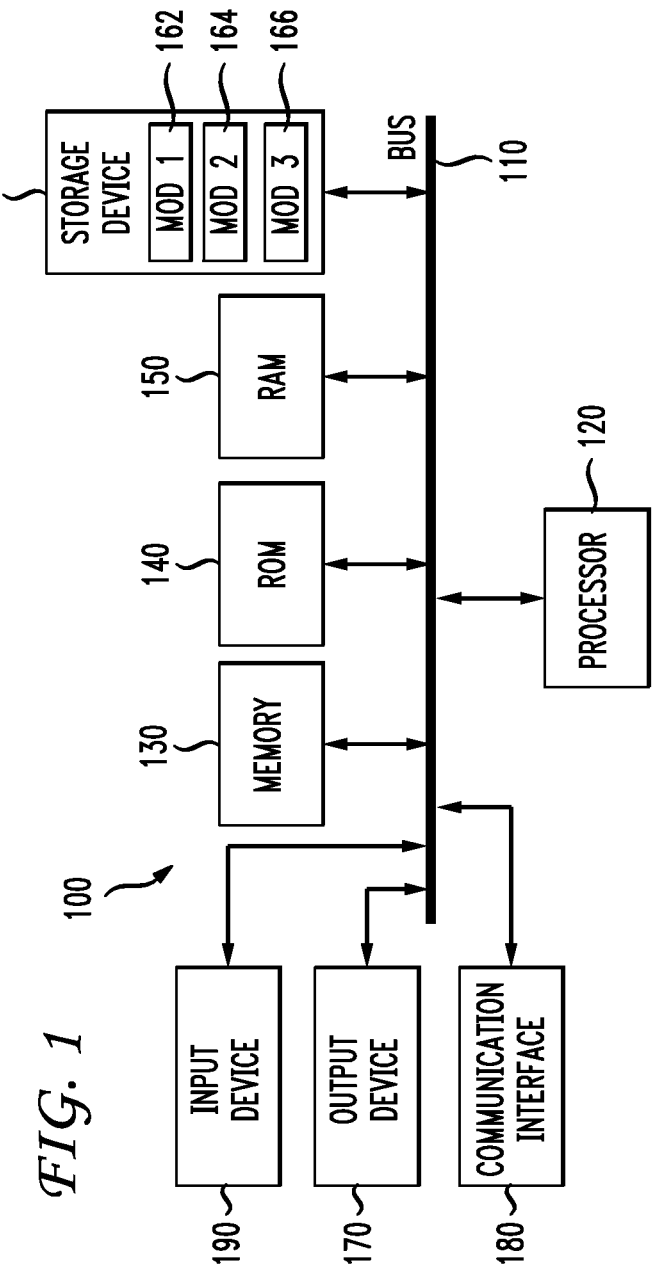
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
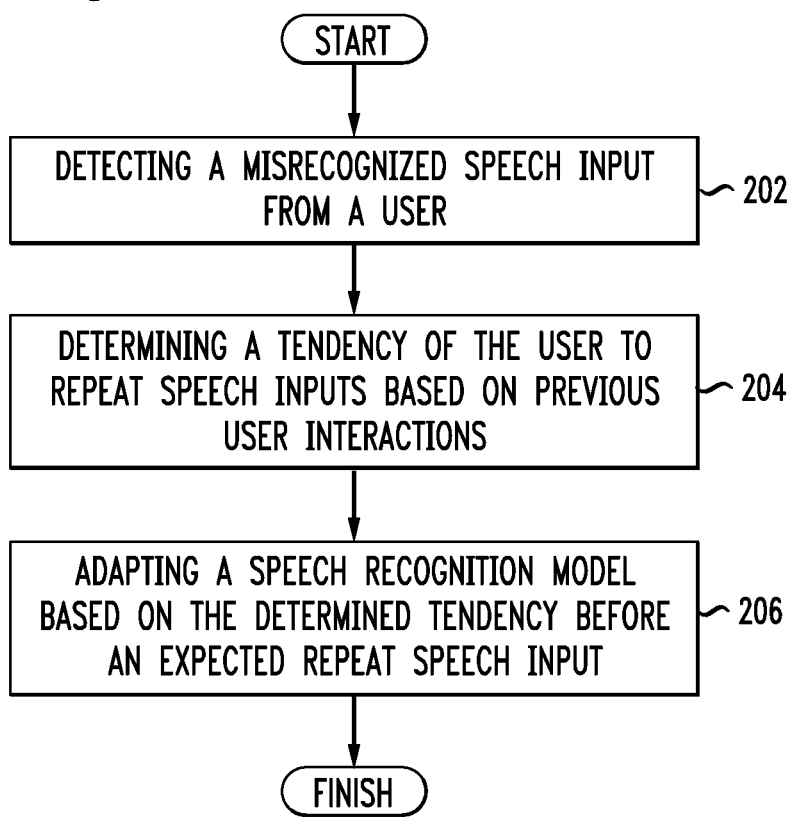
FIG. 2 illustrates an example method embodiment.

Having disclosed some basic system components, the disclosure now turns to the exemplary method embodiment shown in FIG. 2. For the sake of clarity, the method is discussed in terms of an exemplary system 100 such as is shown in FIG. 1 configured to practice the method.

FIG. 2 illustrates a method which a system 100 can perform for handling expected repeat speech queries. The system 100 first detects via a processor a misrecognized speech query from a user (202). The system can detect misrecognized speech by comparing a speech recognition confidence score to a misrecognition threshold, for example. In some cases, the system can detect instead a situation which is likely to cause misrecognized speech, such as a prompt where a user's speech was previously misrecognized. The system 100 then determines a tendency of the user to repeat speech queries based on previous user interactions (204). The system 100 can determine the user's tendency based on the user's usage history, a user profile, similarities between the user and others who are likely to repeat speech queries, geographic data, social network information, time of day, type of query, background noise, and/or any other relevant information. The tendency to repeat can include not only the likelihood of a repeat speech input, but also a stylistic tendency of the repeat speech input, such as a tendency to repeat louder, slower, more clearly, with a slightly different accent, more irritably, and/or any other repeat speech characteristics.

The system 100 then adapts a speech recognition model based on the determined tendency or tendencies before an expected repeat speech query (206). The system 100 can adapt the speech model by modifying an existing acoustic model, language model, and/or semantic model. In one embodiment, the system 100 prepares a personalized search speech recognition model for the expected repeat speech query based on the user's usage history and entries in a recognition lattice. Further, the system 100 can retain an unmodified speech recognition model in parallel with the adapted speech recognition model. In this manner, the system 100 is prepared for either an expected repeat query or a non-repeat query. The system 100 recognizes the expected repeat speech query from the user based on the adapted speech recognition model and/or the parallel unmodified speech recognition model.

Because the system adapts the speech recognition model under what may be a short time constraint, the system can identify and make a number of high priority adaptations which can be accomplished within the expected time constraints. If the expected repeat speech input comes later than expected, the system can continuously adapt the speech recognition model until and shortly after the expected repeat speech input actually occurs.

In one aspect, the system 100 further recognizes the repeat speech query with the unmodified speech recognition model and with the adapted speech recognition model, determines a recognition certainty for the unmodified speech recognition model and the adapted speech recognition model, and bases further interaction with the user on the determined recognition certainty. In a related aspect, the system 100 further determines likely speech characteristics of the expected repeat speech query, and tailors the adapted speech recognition model to the likely speech characteristics of the expected repeat speech query. In order to aid recognition of future repeat queries, the system can record user behavior in a speech query history.

In order to better illustrate the concepts disclosed herein, FIGS. 3 and 4 provide non-concrete examples of situations and dialogs having repeat utterances or repeat queries. FIG. 3 illustrates a sample dialog 300 with repeat user utterances between a user 302 and an ASR system 304 interfacing with a directory of names. The ASR system 304 first asks the user 302 "Whom are you calling?" 306. The user 302 replies "Kevin Williams" 308. The ASR system 304 misrecognizes the user and says "Devon Wilson, OK" 310. At this point, the user 302 interrupts the ASR system 304 and says "NO! Ke-vin Will-yums" 312, annunciating each syllable more clearly than before. The ASR system 302 misrecognizes the user yet again and says "Kevin Wilson, OK" 314. The user 302 interrupts yet again and says "no . . . Kevin Weel-yuuumms" 316 in order to further accentuate the misrecognized portions. The dialog can continue 318 in this manner for many dialog turns. In this example the user varies the pronunciation of the uttered words but could also vary the position of the microphone, change locations (i.e. move to a quieter location), say the words slower or faster, change accent, say the words in a higher or lower pitch, etc. FIG. 4 illustrates another sample dialog with repeat user utterances where the user changes accent and pronunciation in order to assist the ASR system in properly recognizing the speech.

Figure 5:
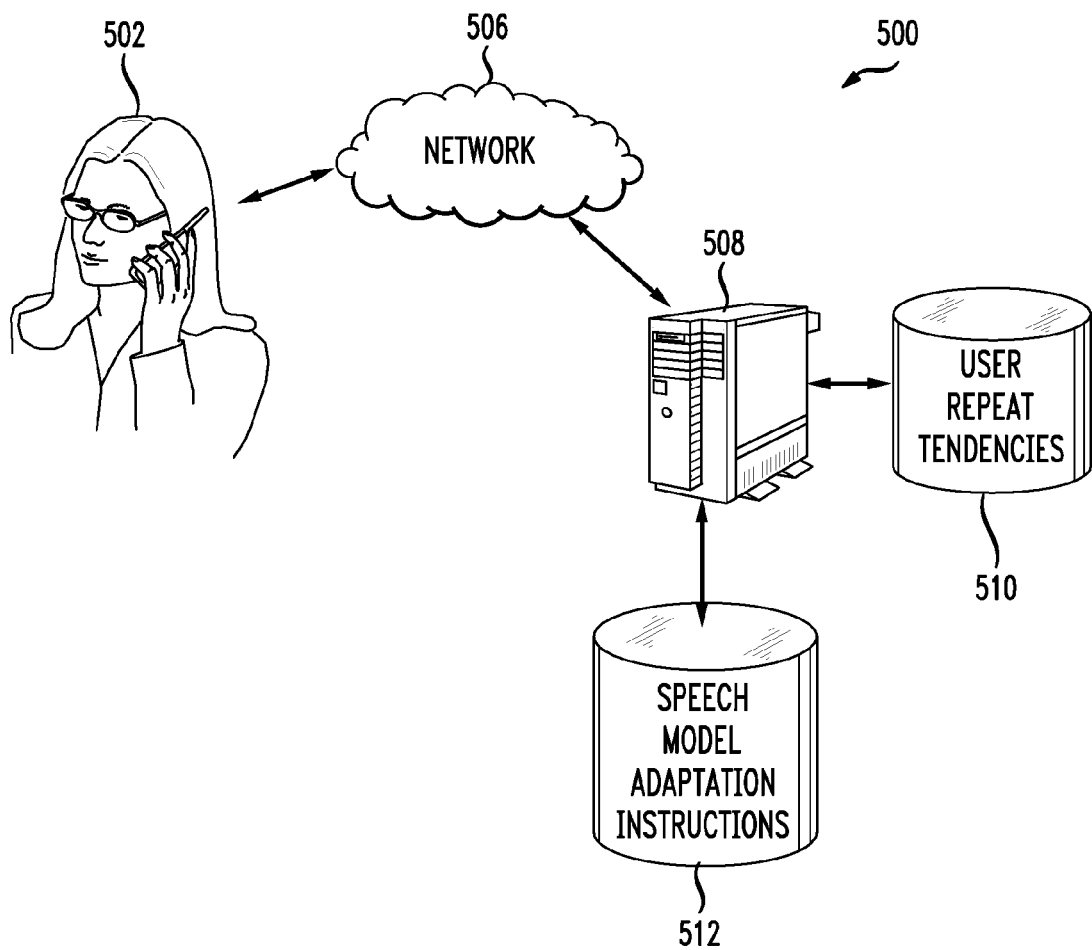
FIG. 5 illustrates an exemplary system configuration for dealing with repeat utterances.

FIG. 5 illustrates an exemplary system 500 configuration for dealing with repeat utterances. In this system 500, the user 502 speaks into a communications device 504 such as a cellular phone, voice over IP device, landline telephone, etc. The communications device 504 communicates via a network 506 with an ASR system 508 and can transmit identifying information such as a phone number, account number, or other unique identifier in addition to a voice signal. The ASR system 508 can retrieve user repeat tendencies 510 based on the identifying information. The ASR system 508 can also retrieve speech model adaptation instructions based on the identifying information and/or the user repeat tendency. When the system detects an utterance that is likely misrecognized, the system can adapt the speech model before the user is able to repeat the query. In this way the system is prepared in advance for the expected repeat query. The speech model can be adapted based on previous interactions with the user. For example, if the user had problems at a particular point in a dialog in the past, the system can adapt the speech model at that point in a later dialog in order to anticipate possible misrecognition problems.

The ASR system 508 can adapt the speech models while waiting on the user to do or say something. In that waiting period, the ASR system can go back and use the word lattice of the recognition output, because the best output could be wrong, and check the top ten (or top N) list of recognition candidates which is likely to have the correct recognition output. The ASR system 508 then recognizes user speech with the adapted model. When the recognition is successful and repeat utterances are no longer anticipated, the ASR system 508 removes the adaptations from the operating speech model, but can store any updated information back in the database of speech model adaptation instructions 512.

Some benefits of the proposed solution include improved recognition performance by avoiding many repetitions of the virtually identical query, happier customers, and customers are more likely to continue to use the application rather than abandon it due to poor performance. Such speech applications can be tailored so that this approach is used only in case of speakers that are known to have problems achieving good performance from the generic ASR models (detected through confidence scores and past usage behavior, for example). In this way, the system can adapt to future utterance that might not happen without creating a large additional hardware demand. However, even a simple model could predict with high degree of confidence if a repeat query is likely, invoking the personalization processing step.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein are applicable to customer service applications and almost any other automated speech recognition system. The same principles also apply to non-speech applications, such as keyboard-based input, multimodal user input, graffiti or gesture based input, etc. Those skilled in the art will readily recognize various modifications and changes that may be made to the principles described herein without following the example embodiments and applications illustrated and described herein, and without departing from the spirit and scope of the disclosure.

We claim:

1. A method comprising:
    identifying, based on past interactions with a user participating in a dialog with a speech dialog system, an adaptation schema which, when applied to a speech recognition model, increases a likelihood the speech recognition model will recognize misrecognized speech from the user relative to an unadapted speech recognition model;
    determining, via a processor configured to perform speech recognition, that the user has previously repeated speech inputs based on interactions with the user prior to initiating the dialog, to yield a determination; and
    adapting, via the processor and based on the determination, the speech recognition model using the adaptation schema before an expected repeat speech input, wherein adapting the speech recognition model further comprises modifying an acoustic model, a language model, and a semantic model.

2. The method of claim 1, further comprising recognizing the expected repeat speech input from the user based on an adapted speech recognition model.

3. The method of claim 1, wherein adapting the speech recognition model further comprises preparing a personalized search speech recognition model for the expected repeat speech input based on a usage history of the user and entries in a recognition lattice.

4. The method of claim 1, further comprising retaining an unmodified speech recognition model in parallel with an adapted speech recognition model.

5. The method of claim 1, further comprising:
    recognizing a repeat input query with an unmodified speech recognition model and with an adapted speech recognition model;
    determining a recognition certainty for the unmodified speech recognition model and the adapted speech recognition model; and
    basing further interaction with the user on the recognition certainty.

6. The method of claim 1, further comprising:
    determining likely speech characteristics of the expected repeat speech input; and
    tailoring an adapted speech recognition model to the likely speech characteristics of the expected repeat speech input.

7. The method of claim 1, further comprising recording user behavior in a speech input history.

8. A system comprising:
    a processor configured to perform speech recognition; and
    a computer-readable storage medium having instruction stored which, when executed by the processor, cause the processor to perform operations comprising:
    identifying, based on past interactions with a user participating in a dialog with a speech dialog system, an adaptation schema which, when applied to a speech recognition model, increases a likelihood the speech recognition model will recognize misrecognized speech from the user relative to an unadapted speech recognition model;

determining that the user has previously repeated speech inputs based on interactions with the user prior to initiating the dialog, to yield a determination; and adapting, based on the determination, the speech recognition model using the adaptation schema before an expected repeat speech input, wherein adapting the speech recognition model further comprises modifying an acoustic model, a language model, and a semantic model.

9. The system of claim 8, the computer-readable storage medium having additional instructions stored which, when executed by the processor, cause the processor to perform operations comprising recognizing the expected repeat speech input from the user based on an adapted speech recognition model.

10. The system of claim 8, wherein adapting the speech recognition model further comprises preparing a personalized search speech recognition model for the expected repeat speech input based on a usage history of the user and entries in a recognition lattice.

11. The system of claim 8, the computer-readable storage medium having additional instructions stored which, when executed by the processor, cause the processor to perform operations comprising retaining an unmodified speech recognition model in parallel with an adapted speech recognition model.

12. The system of claim 8, the computer-readable storage medium having additional instructions stored which, when executed by the processor, cause the processor to perform operations comprising:
  recognizing a repeat input query with an unmodified speech recognition model and with an adapted speech recognition model;
  determining a recognition certainty for the unmodified speech recognition model and the adapted speech recognition model; and
  basing further interaction with the user on the recognition certainty.

13. The system of claim 8, the computer-readable storage medium having additional instructions stored which, when executed by the processor, cause the processor to perform operations comprising:
  determining likely speech characteristics of the expected repeat speech input; and
  tailoring an adapted speech recognition model to the likely speech characteristics of the expected repeat speech input.

14. The system of claim 8, the computer-readable storage medium having additional instructions stored which, when executed by the processor, result in operations comprising recording user behavior in a speech input history.

15. A computer-readable storage device having instructions stored which, when executed by a computing device configured to perform speech recognition, cause the computing device to perform operations comprising:
  identifying, based on past interactions with a user participating in a dialog with a speech dialog system, an adaptation schema which, when applied to a speech recognition model, increases a likelihood the speech recognition model will recognize misrecognized speech from the user relative to an unadapted speech recognition model;
  determining that the user has previously repeated speech inputs based on interactions with the user prior to initiating the dialog, to yield a determination; and
  adapting, based on the determination, the speech recognition model using the adaptation schema before an expected repeat speech input, wherein adapting the speech recognition model further comprises modifying an acoustic model, a language model, and a semantic model.

16. The computer-readable storage device of claim 15, having additional instructions stored which, when executed by the computing device, cause the computing device to perform operations comprising recognizing the expected repeat speech input from the user based on an adapted speech recognition model.

17. The computer-readable storage device of claim 15, wherein adapting the speech recognition model further comprises preparing a personalized search speech recognition model for the expected repeat speech input based on a usage history of the user and entries in a recognition lattice.

18. The computer-readable storage device of claim 15, having additional instructions stored which, when executed by the computing device, cause the computing device to perform operations comprising retaining an unmodified speech recognition model in parallel with an adapted speech recognition model.

19. The computer-readable storage device of claim 15, having additional instructions stored which, when executed by the computing device, cause the computing device to perform operations comprising:
  recognizing a repeat input query with an unmodified speech recognition model and with an adapted speech recognition model;
  determining a recognition certainty for the unmodified speech recognition model and the adapted speech recognition model; and
  basing further interaction with the user on the recognition certainty.

20. The computer-readable storage device of claim 15, having additional instructions stored which, when executed by the computing device, cause the computing device to perform operations comprising:
  determining likely speech characteristics of the expected repeat speech input; and
  tailoring an adapted speech recognition model to the likely speech characteristics of the expected repeat speech input.

* * * * *